Nov. 5, 1968  B. KISLIN ET AL  3,408,847
SPECTACLE NOSEPAD ADJUSTER
Filed May 27, 1966  2 Sheets-Sheet 2

INVENTORS
BENJAMIN KISLIN
J. W. MILLER
BY Harry A. Herbert Jr.
Arsen Tashjian
ATTORNEYS

# United States Patent Office 3,408,847
Patented Nov. 5, 1968

3,408,847
SPECTACLE NOSEPAD ADJUSTER
Benjamin Kislin and J. W. Miller, San Antonio, Tex., assignors to the United States of America as represented by the Secretary of the Air Force
Filed May 27, 1966, Ser. No. 554,299
3 Claims. (Cl. 72—311)

ABSTRACT OF THE DISCLOSURE

A fixture for adjusting by spreading and narrowing the nosepad spacing of a pair of spectacles including a base platform on which are mounted a pair of elongated members having tapered grooves of specified configuration therealong. As the spectacles are passed forward and back along in engagement with the members, the nosepad spacing becomes progressively wider and narrower depending upon which of the members the spectacles are positioned and which direction they are being moved.

---

The invention described herein may be manufactured and used by or for the United States Government for governmental purposes without payment to us to any royalty thereon.

This invention relates to an ophthalmic device, and more particularly to an adjustment fixture for establishing the correct degree of separation between the nosepads on spectacles.

In order to properly fit spectacles to a particular individual, it is advantageous for the optical center of the lenses be in alignment with the pupils of the individual's eyes. Since the frame is supported on bridge of the nose of the individual, the position of the spectacles in relation to the eyes is determined by the spacing between the nosepads. Due to differences in the facial characteristics of various individuals, it is necessary to adjust the nosepad spacing relative to the bridge of the nose to assure proper placement of the lenses before the eyes and to provide a comfortable fit for the wearer.

This invention is concerned with providing a fixture which spreads or narrows the nosepad spacing of the spectacles depending on the contours of the wearer's nose and provides a comfortable fit as well as symmetrical alignment with the pupils of the wearer's eyes.

In presently known methods, adjustment is accomplished by using pliers to bend the nosepads until, by the trial-and-error method, the spectacles are fitted to the individual. This procedure is time-consuming and many times the spectacle frames are weakened or damaged, particularly where repeated adjustments are necessary and inexperienced persons perform the fitting operation. Also, it is very difficult for even experienced optical personnel to adjust the nosepads so that both are exactly symmetrical.

Accordingly, it is an object of the present invention to provide means for symmetrically adjusting the spacing between spectacle nosepads to fit the spectacles to a particular individual.

Another object of the invention is to provide a device which will permit inexperienced individuals to adjust the bendable nosepads on spectacles to fit themselves or other individuals.

Still another object of the invention is to provide means for quickly and safely adjusting the nasal fit of a spectacle frame without using pliers or other tools which may weaken the nosepad arms.

A still further object of the invention is to provide an efficient and compact device for quickly and accurately adjusting the nosepads which control the position of spectacles with respect to the eyes of the wearer.

These and other objects, features and advantages will become more apparent after considering the following detailed description taken in conjunction with the annexed drawings and appended claims.

In the drawings wherein like reference characters refer to like parts in the several views.

Figure 1:
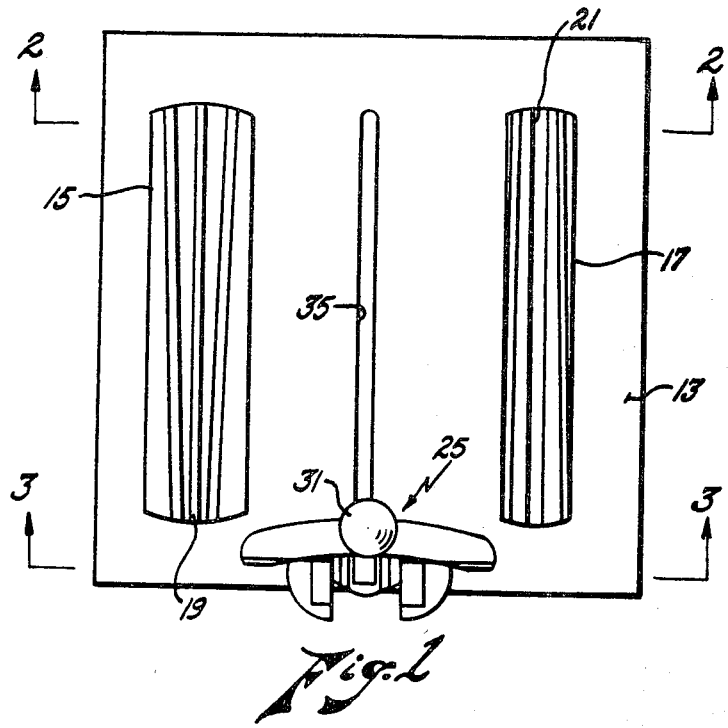
FIG. 1 is a top view of the nosepad adjuster according to the invention.
Figure 2:
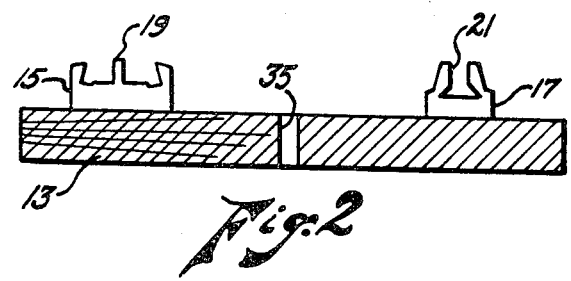
FIG. 2 is a view in cross-section taken along the line 2—2 of FIG. 1.
Figure 3:
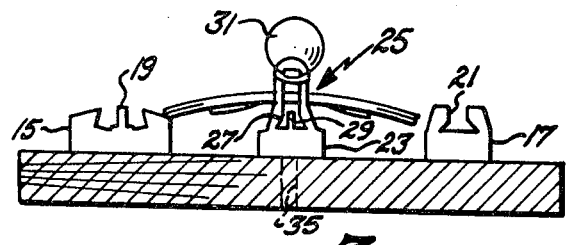
FIG. 3 is a view in partial cross-section taken along the line 3—3 of FIG. 1.

Referring now to the figures wherein like reference characters are used to refer to like elements of the apparatus, the invention includes a wooden base platform 13 on which there is positioned a pair of elongated members 15 and 17 in spaced parallel relationship to one another. The member 15 includes an upstanding center rail 19 having a tapered groove on each side thereof.

The member 17 is provided with a mortise-shaped groove 21 along its center line with the walls of the groove varying in width from front to rear. A bracket 23 is positioned near the front center of the base platform 13 for retaining a spectacle holder 25 thereon while the spectacles are being attached thereto.

The spectacle holder 25 includes a downward extending engaging portion 27 having a tenon-shaped groove 21 in member 17. A slot 29 is positioned along the center of the downward extending portion 27 for engagement with the upstanding rail 19 on the member 15.

A slot 35 in the base platform 13 is located midway between the members 15 and 17 and parallel thereto. One of the temple elements (not shown) of the spectacles 33 passes through the slot 35 while the nosepad adjustment is carried out. The other temple element clears the outer edge of the base platform 13 allowing the holder 25 with the spectacles 33 clamped therein to be moved forward and back along the members 15 and 17.

In the practice of the invention the spectacles 33 are positioned in the spectacle holder 25 while situated on the retaining bracket 23. The spectacles 33 are engaged in the forward slot of spectacle holder 25 and locked in place by ball bearing pressure on the metal bridge and the fit of the eyewire against the transverse shoulder of the holder 25. The downward extending portion of the holder 25 is inserted in the upper rear portion of one of the elongated members 15 or 17. The particular member 15 or 17 into which the spectacle holder 25 is inserted is determined by the relation of the initial setting of the nosepads 37 to the desired final setting.

Figure 4:
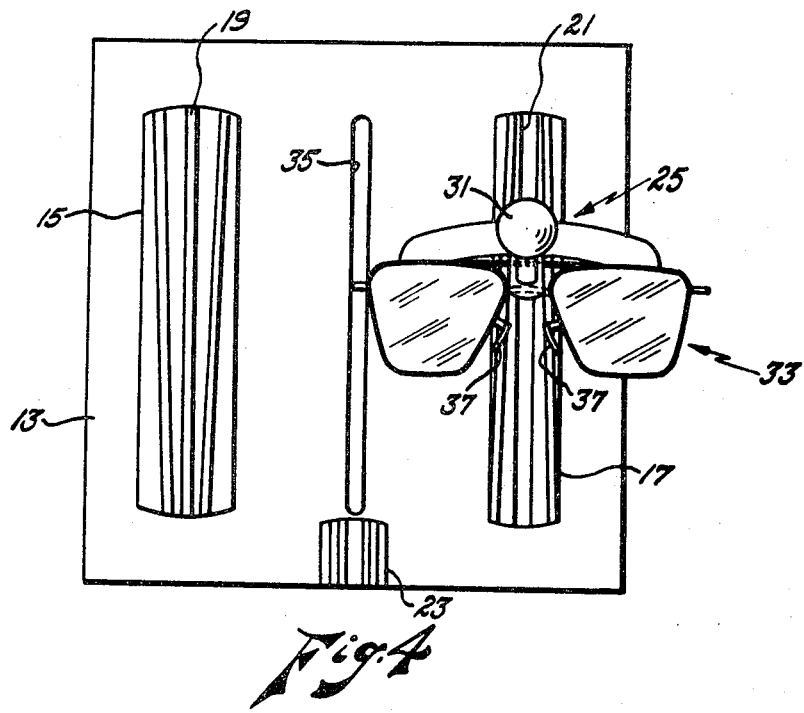
FIG. 4 is a top view of the nosepad adjuster with spectacles and holder in position for making a nosepad adjustment.
Figure 5:
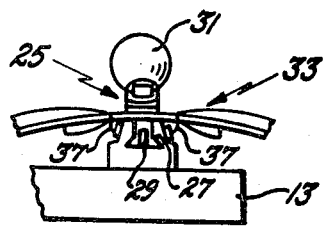
FIG. 5 is a partial end view showing the spectacles in position for spreading the nosepads.

For example, if the nosepads 37 are too close together and it is necessary to spread them apart a certain distance in order to properly fit the spectacles 33 to a particular individual, the tenon-shaped engaging portion 27 of the spectacle holder 25 is inserted into the mortise-shaped groove at rearward extremity of the elongated member 17. The holder 25 with the spectacles 33 held therein is drawn forward along the member 17. As shown in FIGS. 4 and 5, the nosepads 37 engage the outer surface of the groove walls which vary in width and become wider toward the forward end of the member 17. Thus, as the spectacles 33 in the holder 25 are drawn forward, the nosepads 37 are forced outward away from one another by the walls of the groove 21. When the nosepads 37 are spread the proper amount, the holder 25 with the spectacles 33 attached thereto is then withdrawn from the rearward end of the member 17, leaving the nosepads 37 set at the proper position for an accurate and comfortable fit to the particular individual.

Figure 6:
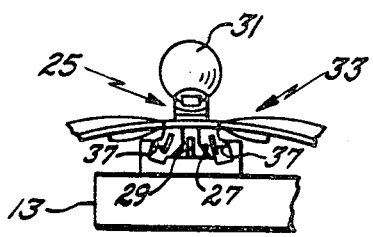
FIG. 6 is a partial end view showing the spectacles in position for narrowing the nosepad spacing.

If it is necessary to narrow the spacing between the nosepads 37, the holder 25 with the spectacles 33 attached thereto is positioned so that the slot 29 engages the upstanding rail 19 at the rearward end of the elongated member 15. As shown in FIG. 6, the nosepads 37 engage the inner surface of the tapered grooves in the member 15. Since the tapered grooves are narrower at the forward end of the member 15, the nosepads 37 are forced toward each other as the spectacles 33 in the holder 25 are drawn forward. When the nosepads 37 are sufficiently close together, the holder 25 with the spectacles 33 attached thereto is pushed back out of the rearward end of the member 15. The nosepads 37 remain set at the proper separation for the precise and correct setting for the particular individual to whom the spectacles 33 were fitted.

Although the invention has been illustrated and described in terms of a preferred embodiment thereof, it will be apparent to those skilled in the art that certain changes, alterations, modifications and substitutions can be made in the arrangement and location of the various elements without departing from the spirit and scope of the appended claims.

Having thus set forth and described the nature of our invention, what we claim is:

1. An adjusting means for varying the spacing between the nosepads of a pair of spectacles having bendable nosepads, said adjusting means comprising a base platform, first and second elongated members in spaced parallel relationship fixedly attached to said base platform, said elongated members having engagable tapered portions therealong, a spectacle holder for retaining said spectacles in a fixed position therewith, said spectacle holder having a downwardly extending portion in slidable engagement with said elongated members, the nosepads of said spectacles engaging the tapered portions of said elongated members, movement of said spectacle holder with said spectacles attached thereto along one of said elongated members producing a variation in the spacing between the nosepads of said spectacles corresponding to the location of said spectacles with respect to the tapered portion of said elongated members.

2. The adjusting means defined in claim 1 wherein the first of said parallel elongated members includes tapered means for spreading the nosepads of said spectacles, said first elongated member having a mortise-shaped groove along the central axis thereof, the walls of said mortise-shaped groove varying in thickness along the length thereof, the downwardly extending portion of said spectacle holder being tenon-shaped for slidable engagement with the mortise-shaped groove in said first elongated member, the nosepads of said spectacles being spread apart as said spectacle holder with said spectacles therein is drawn along said first elongated member with the nosepads in contact with the outer surface of the walls of the mortise-shaped groove.

3. The adjusting means defined in claim 1 wherein the second of said parallel elongated members includes tapered means for narrowing the spacing of the nosepads of said spectacles, said second elongated member having an upstanding rail along the central axis thereof, said rail having a tapered groove symmetrically positioned on each side thereof, the downwardly extending portion of said spectacle holder being slotted for slidable engagement with the upstanding rail in said second elongated member, the spacing between the nosepads of said spectacles being narrowed as said spectacle holder with said spectacles therein is drawn along said second elongated member with the nosepads in contact with the wall surface of tapered grooves in said second elongated member.

References Cited

UNITED STATES PATENTS

| 2,684,002 | 7/1954 | Horvath | 81—3.5 |
| 3,108,504 | 10/1963 | Eichinger | 81—3.5 |

CHARLES W. LANHAM, *Primary Examiner.*

L. A. LARSON, *Assistant Examiner.*